(12) United States Patent
Uozumi et al.

(10) Patent No.: US 9,944,808 B2
(45) Date of Patent: Apr. 17, 2018

(54) NON-AQUEOUS PIGMENT INK

(75) Inventors: Shunsuke Uozumi, Inashiki-gun (JP); Ayako Mochizuki, Inashiki-gun (JP)

(73) Assignee: RISO KAGAKU CORPORATION, Tokyo (JP)

( * ) Notice: Subject to any disclaimer, the term of this patent is extended or adjusted under 35 U.S.C. 154(b) by 234 days.

(21) Appl. No.: 12/076,600

(22) Filed: Mar. 20, 2008

(65) Prior Publication Data

US 2008/0229974 A1 Sep. 25, 2008

(30) Foreign Application Priority Data

Mar. 23, 2007 (JP) ................................. 2007-076875

(51) Int. Cl.
*C09D 11/02* (2014.01)
*C09D 11/36* (2014.01)
*C08K 5/17* (2006.01)

(52) U.S. Cl.
CPC ............... *C09D 11/36* (2013.01); *C08K 5/17* (2013.01)

(58) Field of Classification Search
USPC .......................................................... 106/31
See application file for complete search history.

(56) References Cited

U.S. PATENT DOCUMENTS

| | | | | |
|---|---|---|---|---|
| 4,764,447 A | * | 8/1988 | Tsubuko et al. | 430/115 |
| 5,478,383 A | * | 12/1995 | Nagashima et al. | 106/31.43 |
| 5,922,117 A | * | 7/1999 | Malhotra et al. | 106/31.58 |
| 5,958,121 A | | 9/1999 | Lin | |
| 7,377,974 B2 | * | 5/2008 | Grimm et al. | 106/31.8 |

FOREIGN PATENT DOCUMENTS

| | | |
|---|---|---|
| CN | 1558935 A | 12/2004 |
| CN | 1890328 A | 1/2007 |
| JP | 62-018410 A | 1/1987 |
| JP | 62-018572 A | 1/1987 |
| JP | 9-151342 A | 6/1997 |
| JP | 11-140343 A | 5/1999 |
| JP | 11-148033 A | 6/1999 |
| JP | 2006-206686 A | 8/2006 |
| WO | 03/014238 A1 | 2/2003 |
| WO | 2005/056694 A1 | 6/2005 |
| WO | WO2005/056694 * | 6/2005 ............. C09D 11/00 |

OTHER PUBLICATIONS

Mohri et al. J. Oleo Sci., 50(8), 623-631, 2001.*
Chinese Search Report, dated Feb. 20, 2013, two (2) pages.
Official Action dated Apr. 10, 2012 in the counterpart Japanese Application.

* cited by examiner

*Primary Examiner* — Yun Qian
(74) *Attorney, Agent, or Firm* — Hamre, Schumann, Mueller & Larson, P.C.

(57) ABSTRACT

A non-aqueous pigment ink that includes a colorant and a non-aqueous solvent, wherein the colorant is a pigment complex of a pigment, a dispersant and an amine compound, the amine compound is a diamine and/or triamine comprising two or more primary and/or secondary amino groups within each molecule, and the dispersant comprises two or more reactive functional groups within each molecule that exhibit reactivity with the amino groups of the amine compound.

16 Claims, No Drawings

NON-AQUEOUS PIGMENT INK

CROSS REFERENCE TO RELATED APPLICATIONS

This application is based upon and claims the benefit of priority from the prior Japanese Patent Application No. 2007-076875, filed on Mar. 23, 2007; the entire content of which is incorporated herein by reference.

BACKGROUND OF THE INVENTION

1. Field of the Invention

The present invention relates to a non-aqueous pigment ink, and more particularly to a non-aqueous pigment ink that is suited to use within an inkjet recording system.

2. Description of the Related Art

Inkjet recording systems are printing systems in which printing is conducted by spraying a liquid ink with a high level of fluidity from ultra-fine nozzles, and adhering that ink to a recording medium such as a sheet of paper. These systems are comparatively cheap and offer the advantage of enabling high-resolution, high-quality images to be printed rapidly and with minimal noise, and consequently continue to spread rapidly.

The coloring materials for the inks used in these inkjet recording systems can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. In an aqueous ink, because an aqueous solvent and water act as the ink medium, finely dispersing a pigment within this medium and then maintaining the stability of that dispersion is extremely difficult.

As a result, aqueous pigment inks have been proposed in which the pigment is encapsulated, thereby enabling dispersion within an aqueous medium (see Japanese Patent Laid-Open No. H09-151342 and Japanese Patent Laid-Open No. H11-140343). However, because the inks are water-based, the problem of poor water resistance is unavoidable.

In contrast, non-aqueous inks that do not use water for the ink solvent, including solvent-based inks that use a volatile solvent as the main constituent and oil-based inks that use a non-volatile solvent as the main constituent, are now attracting considerable attention. Non-aqueous inks exhibit superior drying properties to aqueous inks, and also offer excellent printability.

These non-aqueous inks typically comprise a non-aqueous solvent, a binder resin, and a pigment and the like. One problem associated with inkjet pigment inks is the problem of ink blockages within the printing head. Methods that have been proposed to overcome this problem include increasing the quantity of solvent, and adjusting the viscosity of the ink to a viscosity appropriate for inkjet spraying.

However, increasing the quantity of solvent causes a reduction in the resin concentration, and because the resin penetrates into the recording medium together with the solvent, the binder strength becomes inadequate and the pigment fixation tends to deteriorate. These tendencies are particularly marked in those cases where the recording medium is a readily permeable paper such as plain paper.

On the other hand, if the resin quantity is increased in order to improve the fixation of the pigment to the recording medium and the scratch resistance, then the viscosity of the ink increases, which increases the likelihood of nozzle blockages.

Accordingly, current inks are prepared with either the ink viscosity or the pigment fixation given priority.

Moreover, compared with aqueous inks, non-aqueous inks exhibit a higher level of affinity between the coloring material and the solvent, and consequently a problem arises in that when the ink bonds to the paper, the coloring material does not remain at the paper surface, but rather penetrates into the interior of the paper with the solvent, causing a reduction in the ink density at the printed surface (the upper surface) of the printed item, and increasing the likelihood of strike-through at the non-printed surface (the underside). Furthermore, in the case of pigment inks, a pigment dispersant is usually added to improve the dispersibility of the pigment, but increasing the blend quantity of the dispersant in order to ensure favorable storage stability tends to cause an associated deterioration in the scratch resistance.

SUMMARY OF THE INVENTION

Accordingly, an object of the present invention is to provide a non-aqueous pigment ink which exhibits superior storage stability and pigment dispersibility, and which is able to maintain favorable levels of print density and scratch resistance for the printed item even when the recording medium is a readily permeable medium such as plain paper.

A first aspect of the present invention provides a non-aqueous pigment ink comprising a colorant and a non-aqueous solvent, wherein the colorant is a pigment complex of a pigment, a dispersant and an amine compound, the amine compound is a diamine and/or triamine comprising two or more primary and/or secondary amino groups within each molecule, and the dispersant comprises two or more reactive functional groups within each molecule that exhibit reactivity with the amino groups of the amine compound.

A second aspect of the present invention provides a printed item printed using the non-aqueous pigment ink according to the first aspect of the present invention described above.

A third aspect of the present invention provides a colorant obtained by: adding an amine compound that is a diamine and/or triamine comprising two or more primary and/or secondary amino groups within each molecule to a pigment dispersion comprising a pigment, a dispersant comprising two or more reactive functional groups within each molecule that exhibit reactivity with primary and/or secondary amino groups, and a non-aqueous solvent; and reacting the dispersant with the amine compound.

DETAILED DESCRIPTION OF THE EMBODIMENTS

A non-aqueous pigment ink according to the present invention (hereafter also referred to as simply "the ink") uses, as a colorant, a complex of three materials, namely a pigment, a dispersant, and an amine compound that undergoes a reaction with the reactive functional groups within the dispersant, thereby forming chemical bonds to the dispersant. As a result, the ink according to the present invention exhibits high levels of storage stability and pigment dispersibility, and has excellent discharge stability that prevents the occurrence of nozzle blockages. Moreover, the ink according to the present invention is able to maintain superior levels of print density with good suppression of strike-through of the ink or printed image, and provides favorable scratch resistance, even when the recording medium is a readily permeable medium such as plain paper.

In other words, the colorant contained within the ink is a pigment complex comprising a pigment, a dispersant and an amine compound. More specifically, the amine compound is a diamine and/or triamine comprising two or more primary and/or secondary amino groups within each molecule, and the dispersant comprises reactive functional groups that exhibit reactivity with these amino groups.

In this pigment complex, the amino groups of the amine compound react with the reactive functional groups of the dispersant, such that the amine compound and the dispersant exist in a mutually bonded state. It is thought that because both of the components (the amine compound and the dispersant) contain a plurality of reactive sites, bonding of the two components occurs at two or more locations within each molecule, meaning the amine compound at least partially covers the pigment adsorbed to the dispersant. In other words, it is surmised that the amine compound functions, at least partially, as a shell component, forming an encapsulated pigment or some similar state, and this represents a preferred embodiment of the pigment complex in the present invention.

Examples of pigments that can be used include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese, and nickel, as well as metal oxides and sulfides, and yellow ocher, ultramarine and iron blue pigments; and carbon blacks such as furnace carbon black, lamp black, acetylene black, and channel black. These pigments may be used either alone, or in combinations of two or more different pigments.

From the viewpoint of ensuring favorable dispersibility and storage stability, the average particle size of the pigment is preferably not greater than 300 nm, is even more preferably not greater than 150 nm, and is most preferably 100 nm or smaller. In this description, the average particle size of the pigment refers to the value measured using a dynamic light-scattering particle size distribution measurement apparatus LB-500 manufactured by Horiba, Ltd.

The quantity of the pigment within the ink is typically within a range from 0.01 to 20% by weight, and from the viewpoints of print density and ink viscosity, is preferably within a range from 1 to 15% by weight, and even more preferably from 5 to 10% by weight.

The dispersant is a reactive pigment dispersant, and comprises, as reactive functional groups, at least two functional groups within each molecule that exhibit reactivity with primary or secondary amine groups. By incorporating a plurality of reactive functional groups in this manner, the pigment-covering properties (the encapsulating property) of the amine compound can be favorably realized. This dispersant is preferably a polymer dispersant.

Examples of the reactive functional groups include glycidyl groups, oxetane groups and isocyanate groups, and of these, from the viewpoint of reactivity, glycidyl groups are the most desirable.

In addition to the reactive functional groups described above, the dispersant preferably also comprises lipophilic groups that function as solvent affinity sites, and other functional groups (pigment-adsorbing functional groups) that function as pigment adsorption sites, and is preferably a polymer dispersant comprising these other groups.

The lipophilic groups (solvent affinity groups) function as solvent affinity sites for the non-aqueous solvent, and are preferably hydrocarbon groups of 7 or more carbon atoms, and even more preferably straight-chain alkyl groups of 12 or more carbon atoms (such as a dodecyl group, tridecyl group, tetradecyl group, pentadecyl group, hexadecyl group, heptadecyl group, octadecyl group, nonadecyl group, eicosanyl group, heneicosanyl group or docosanyl group), and/or branched-chain alkyl groups of 8 or more carbon atoms (such as an isooctyl group, 2-ethylhexyl group, isostearyl group or tert-octyl group), and/or aromatic ring-containing groups of 7 or more carbon atoms (such as a benzyl group or phenylethyl group).

It is thought that as a result of the existence of these long-chain (straight or branched) alkyl groups or aromatic ring-containing groups, a steric hindrance effect is obtained, thereby suppressing aggregation between particles, and enabling the pigment complex that functions as the colorant to remain stably dispersed within the solvent. Moreover, if the amine compound was to undergo reaction (cross-linking) in a manner that caused linking between a plurality of dispersant molecules, then this would actually result in an undesirable aggregation of the colorant particles, but it is thought that the presence of the above lipophilic groups causes steric hindrance that reduces the likelihood of reactions of the amine compound that lead to bridging between dispersant molecules, thereby promoting reaction at the plurality of sites within a single dispersant molecule.

The pigment-adsorbing functional groups are groups that function as pigment adsorption sites, and may be selected from amongst basic functional groups such as primary, secondary and tertiary amino groups, and nitrogen heterocyclic compounds; acidic functional groups such as carboxyl groups (e.g., acids, or salts or esters thereof), sulfo groups (e.g., acids, or salts or esters thereof), and glycidyl groups; and aromatic ring-containing groups such as benzyl groups. For example, in those cases where the pigment is a carbon black, because the pigment contains acidic sites, amino groups, and particularly tertiary amino groups, are preferred as the pigment-adsorbing functional groups within the dispersant.

A polymer dispersant that comprises these types of lipophilic groups and pigment-adsorbing functional groups in addition to the aforementioned reactive functional groups is preferably a copolymer that comprises a monomer (M1) containing a lipophilic group, a monomer (M2) containing a pigment-adsorbing functional group, and a monomer (M3) containing a reactive functional group that exhibits reactivity with an amino group. Moreover, acrylic copolymers wherein each of these monomers (M1, M2 and M3) is an acrylic monomer are particularly desirable. Here, the term "monomer" also includes macromonomers, which are high molecular weight monomers that contain a polymerizable functional group.

For example, there are no particular restrictions on the monomer (M1) containing a lipophilic group, provided it is a monomer that contains a functional group with a pigment-dispersing action, and suitable examples include (meth)acrylates containing one of the lipophilic groups exemplified above (such as a straight or branched long-chain alkyl group or aromatic ring-containing group) at the ester portion (such as lauryl (meth)acrylate, isostearyl (meth)acrylate, and benzyl (meth)acrylate), or macromonomers thereof. These monomers may be used alone, or a combination of two or more different M1 monomers may be used.

There are no particular restrictions on the monomer (M2) containing a pigment-adsorbing functional group, provided it is a monomer that contains a functional group with a pigment-adsorbing action such as an amino group, carboxyl group, glycidyl group or benzyl group. Specific examples of suitable monomers include (meth)acrylate monomers such as dimethylaminoethyl (meth)acrylate, (meth)acrylic acid and glycidyl (meth)acrylate, as well as styrene, N-methylpyrrolidone, or styrene macromonomers. These monomers may be used alone, or a combination of two or more different M2 monomers may be used.

An example of a commercially available product that represents a macromonomer corresponding with the monomer M1 is "Macromonomer AS-6" (a methacrylate with a polystyrene chain at the ester portion), manufactured by Toagosei Co., Ltd.

An example of a commercially available product that represents a macromonomer corresponding with the monomer M2 is "Macromonomer AA-6" (a methacrylate with a polymethyl methacrylate chain at the ester portion), manufactured by Toagosei Co., Ltd.

There are no particular restrictions on the monomer (M3) containing a reactive functional group, provided it contains a functional group that exhibits reactivity with a primary or secondary amino group, but monomers such as glycidyl (meth)acrylate and isocyanatoethyl (meth)acrylate are particularly favorable.

In a particularly preferred configuration, the polymer dispersant is an acrylic copolymer comprising;

M1; a (meth)acrylate containing a straight-chain alkyl group of 12 or more carbon atoms and/or a branched-chain alkyl group of 8 or more carbon atoms, M2: a (meth)acrylate containing a tertiary amino group, and M3: glycidyl (meth)acrylate.

In a polymer dispersant comprising the above monomers M1, M2 and M3, from the viewpoint of preventing gelling during polymerization, the respective molar proportions of M1, M2 and M3 (l, m and n respectively), wherein $l+m+n=1$, are preferably such that $m<0.3$, and $0.01<n<0.2$.

The form of the copolymer may be a typical random copolymer, or a copolymer comprising partial block units, and there are no particular restrictions on the copolymer regularity.

The copolymer comprising the monomers M1, M2 and M3 may also include other monomers capable of copolymerization with these monomers. Examples of these other monomers include (meth)acrylate esters such as methyl (meth)acrylate, ethyl (meth)acrylate, and propyl (meth)acrylate; styrene-based monomers such as styrene and α-methylstyrene; as well as maleate esters, fumarate esters, acrylonitrile, methacrylonitrile, vinyl acetate, and α-olefins. These monomers may be used either alone, or in combinations of two or more different monomers.

In addition, a pigment dispersant different from those exemplified above can also be used, provided it contains functional groups that exhibit reactivity with primary or secondary amino groups.

In those cases where the dispersant is a polymer compound, from the viewpoint of ensuring favorable ink discharge properties, the molecular weight (weight average molecular weight) of the polymer dispersant is preferably within a range from approximately 15,000 to 35,000, and even more preferably from approximately 20,000 to 30,000.

The monomers described above can be polymerized easily using a conventional radical copolymerization. The reaction is preferably conducted as either a solution polymerization or a dispersion polymerization.

In order to ensure that the molecular weight of the polymer dispersant following polymerization falls within the preferred range described above, the use of a chain transfer agent during polymerization is effective. Examples of suitable chain transfer agents include thiols such as n-butyl mercaptan, lauryl mercaptan, stearyl mercaptan and cyclohexyl mercaptan.

Examples of suitable polymerization initiators include conventional heat polymerization initiators, including azo compounds such as AIBN (azobisisobutyronitrile), and peroxides such as t-butyl peroxybenzoate and t-butylperoxy-2-ethylhexanoate (Perbutyl O, manufactured by NOF Corporation).

Petroleum-based solvents (such as aroma-free (AF) solvents) and the like can be used as the polymerization solvent used in the solution polymerization. This polymerization solvent is preferably one or more solvents selected from amongst those solvents that can be used, as is, for the non-aqueous solvent for the product ink.

In those cases where the M3 monomer contains a glycidyl group, the polymerization temperature is preferably not too high, in order to prevent ring-opening of the glycidyl group during the polymerization, and conducting the polymerization at a temperature of 65° C. or lower is preferred. For this reason, the use of 2,2'-azobis(2,4-dimethylvaleronitrile) (V-65, manufactured by Wako Pure Chemical Industries, Ltd.), which functions as an oil-soluble, low temperature, azo-based polymerization initiator, is particularly suitable. Photopolymerization initiators that generate radicals upon irradiation with an active energy beam can also be used.

During the polymerization reaction, typically employed polymerization inhibitors, polymerization accelerators and dispersants and the like may also be added to the reaction system.

From the viewpoint of pigment dispersibility, the blend quantity of the dispersant within the ink, reported as a weight ratio relative to a pigment quantity of 1, is preferably within a range from approximately 0.05 to 1.0, and is even more preferably from 0.1 to 0.5.

Relative to the total weight of the ink, the quantity of the dispersant is preferably within a range from approximately 0.5 to 10% by weight, and is even more preferably from 1 to 5% by weight.

Next is a description of the diamine and triamine that function as the amine compound comprising two or more primary and/or secondary amino groups within each molecule.

From the viewpoint of achieving favorable image density on the (upper surface of) the printed item, testing suggests that the number of amino groups within each molecule of the amine compound is preferably not more than three, and is most preferably two.

Moreover, in terms of handling, the use of an amine compound that is liquid at normal temperatures is preferred. If an amine compound that is a solid or viscous liquid at normal temperatures is used, then the amine compound may be heated at the time of use if required.

Examples of preferred diamines include those represented by a general formula (1): $NHR_1-(X)_n-NHR_2$ (wherein, $R_1$ and $R_2$ each represent, independently, a hydrogen atom or an arbitrary monovalent group; X represents at least one bivalent group of 3 or more carbon atoms selected from amongst straight-chain alkylene chains, branched-chain alkylene chains, ethylene oxide chains, propylene oxide chains, and butylene oxide chains; and n represents an integer of 1 or greater). If n is 2 or greater, then X may be a combination of two or more different bivalent groups.

From the viewpoint of achieving favorable solubility within oil-based solvents, the bivalent group X that functions as a linking chain between the two amines is preferably a straight-chain or branched-chain alkylene chain of 3 or more carbon atoms. If the number of carbon atoms within the group X is either 2 or 1, then the pigment is prone to aggregation during the reaction with the reactive functional groups of the dispersant, meaning there is a danger of a deterioration in the storage stability of the ink. On the other hand, from the viewpoint of handling, the number of carbon atoms within the group X is preferably not more than 12. The group X may also contain at least one arbitrary substituent group, such as a hydroxyl group or alkoxy group. From the viewpoint of achieving favorable solubility in the solvent, the value of n is preferably within a range from 1 to 10, and is even more preferably from 1 to 5.

Examples of the substituent groups $R_1$ and $R_2$ within the amino groups include a hydrogen atom, substituted or unsubstituted straight-chain alkyl groups of 1 to 18 carbon atoms, substituted or unsubstituted branched-chain alkyl groups of 1 to 18 carbon atoms, and substituted or unsubstituted cycloalkyl groups of 3 or more carbon atoms. Examples of substituent groups with which the alkyl groups may be substituted include a hydroxyl group and a carboxyl group.

Of the above possibilities, from the viewpoint of storage stability, at least one of $R_1$ and $R_2$ is preferably a substituted or unsubstituted, straight-chain or branched-chain alkyl group of 12 or more carbon atoms. Moreover, the alkyl group is preferably a saturated alkyl group containing no unsaturated bonds.

Specific examples of this type of diamine compound include 1,3-propanediamine, N-methyl-1,3-propanediamine, 2-hydroxyethylaminopropylamine, bis(3-aminopropyl)ether, 1,2-bis(3-aminopropoxy)ethane, 1,3-bis(3-aminopropoxy)-2,2-dimethylpropane, 1,4-diaminobutane, laurylaminopropylamine, α,ω-bis(3-aminopropyl)polyethylene glycol ether, poly(ethylene glycol) bis(3-aminopropyl), N-oleyl-1,3-diaminopropane, N-coconut alkyl-1,3-diaminopropane (wherein the alkyl groups comprise a mixture of C12, C14, C16 and C18 groups and the like), N-tallow alkyl-1,3-diaminopropane (wherein the alkyl groups comprise a mixture of C14, C16 and C18 groups and the like), and N-hardened tallow alkyl-1,3-diaminopropane (wherein the alkyl groups comprise a mixture of C14, C16 and C18 groups and the like).

These diamines may be used either alone, or in combinations of a plurality of different diamines.

Examples of commercially available products include the various diamines manufactured by Koei Chemical Co., Ltd., the product series marketed under the brand name "Duomeen" (such as Duomeen C, CD, M, O, OX, T and HT), manufactured by Lion Akzo Co., Ltd., the products "Diamin R-86" and "Diamin RRT" manufactured by Kao Corporation, and the products "Asphazol #10 and #20" manufactured by NOF Corporation.

Examples of preferred triamines include those represented by a general formula (2): $NHR_1$—$(X)_n$—$NR_3$—$(Y)_m$—$NHR_2$ (wherein, $R_1$, $R_2$ and $R_3$ each represent, independently, a hydrogen atom or an arbitrary monovalent group; X and Y each represent, independently, at least one bivalent group of 3 or more carbon atoms selected from amongst straight-chain alkylene chains, branched-chain alkylene chains, ethylene oxide chains, propylene oxide chains, and butylene oxide chains; and n and m each represent, independently, an integer of 1 or greater). If n or m is 2 or greater, then X or Y respectively may be a combination of two or more different bivalent groups.

From the viewpoint of achieving favorable solubility within oil-based solvents, the bivalent groups X and Y that function as linking chains between the three amines are preferably straight-chain or branched-chain alkylene chains of 3 or more carbon atoms. If the number of carbon atoms within the groups X and Y is either 2 or 1, then the pigment is prone to aggregation during reaction with the reactive functional groups of the dispersant, meaning there is a danger of a deterioration in the storage stability of the ink. On the other hand, from the viewpoint of handling, the number of carbon atoms within the groups X and Y is preferably not more than 12. The groups X and Y may also contain at least one arbitrary substituent group, such as a hydroxyl group or alkoxy group. From the viewpoint of achieving favorable solubility in the solvent, the values of n and m are preferably within a range from 1 to 10, and are even more preferably from 1 to 5.

Examples of the substituent groups $R_1$, $R_2$ and $R_3$ within the amino groups include a hydrogen atom, substituted or unsubstituted straight-chain alkyl groups of 1 to 18 carbon atoms, substituted or unsubstituted branched-chain alkyl groups of 1 to 18 carbon atoms, and substituted or unsubstituted cycloalkyl groups of 3 or more carbon atoms. Examples of substituent groups with which the alkyl groups may be substituted include a hydroxyl group and a carboxyl group.

Of the above possibilities, from the viewpoint of storage stability, at least one of $R_1$, $R_2$ and $R_3$ is preferably a substituted or unsubstituted, straight-chain or branched-chain alkyl group of 12 or more carbon atoms. Moreover, the alkyl group is preferably a saturated alkyl group containing no unsaturated bonds.

Specific examples of this type of triamine compound include iminobispropylamine and methyliminobispropylamine.

These triamines may be used either alone, or in combinations of a plurality of different triamines.

Examples of commercially available products that can be used favorably include the various triamines manufactured by Koei Chemical Co., Ltd., and the product series marketed under the brand name "Triameen" (such as Triameen C, OV, T, Y12D and YT), manufactured by Lion Akzo Co., Ltd.

From the viewpoint of achieving a high print density in the printed item, the quantity of free amino groups within the pigment complex, namely the quantity of amino groups within the above amine compound that do not participate in the reaction with the reactive functional groups of the dispersant, is preferably not too large. Accordingly, the blend quantity of the amine compound is preferably adjusted so that the quantity of amino groups is within a range from 1 to 2.5 equivalents per 1 equivalent of reactive functional groups within the dispersant.

Relative to the total quantity of ink, the amine compound preferably represents a quantity within a range from 0.1 to 5% by weight, and even more preferably from 0.5 to 1.5% by weight.

Of the amino groups within the amine compound, the (free) amino groups that do not participate in the reaction with the reactive functional groups of the dispersant preferably form an acid amide with a carboxylic acid. In other words, the free amino groups amongst the amino groups within the amine compound are preferably converted to an acid amide form by reaction with a carboxylic acid, and this conversion further enhances the print density of the printed item, and enables even better prevention of image strike-through.

From the viewpoints of achieving favorable solubility in oil-based solvents and superior ink storage stability, the carboxylic acid used for forming the acid amide is preferably a monocarboxylic acid rather than a polycarboxylic acid. The reason for this preference is that if a polycarboxylic acid is used, then it can be assumed that cross-linking between pigment particles caused by the carboxyl groups will occur over time, resulting in aggregation of the pigment.

Moreover, from the viewpoints of achieving favorable solubility within oil-based solvents and preventing image strike-through, the use of a carboxylic acid with a molecular weight of not more than 100 is preferred. The reason for this preference is that if the molecular weight of the carboxylic acid is too high, then it can be assumed that there will be a corresponding increase in the relative proportion of the non-polar portion of the molecule, thereby increasing the affinity with the oil-based solvent, and making the pigment complex prone to penetration into the paper together with the solvent.

Accordingly, the use of a monocarboxylic acid with a molecular weight of 100 or less is the most desirable, and specific examples include one or more acids selected from amongst formic acid, acetic acid, propionic acid and butyric acid.

The blend quantity of the carboxylic acid is preferably sufficient to provide from 1 to 2 equivalents of carboxyl groups for each equivalent of free amino groups within the amine compound.

Although the acid amide conversion of the free amino groups proceeds at normal temperatures, it is preferably conducted by heating at a temperature of approximately 80 to 100° C. Furthermore, any excess carboxylic acid left following the reaction is preferably removed by distillation using a solvent evaporation device such as an evaporator.

The pigment complex that functions as the colorant in the present invention can be obtained, for example, by adding the amine compound comprising two or more primary and/or secondary amino groups within each molecule to a pigment dispersion comprising the pigment, the dispersant that comprises two or more reactive functional groups within each molecule that exhibit reactivity with amino groups, and a non-aqueous solvent, and then reacting the reactive functional groups within the dispersant with the amino groups of the amine compound. The non-aqueous solvent (or diluent solvent) used in this case is preferably the same as the non-aqueous solvent (described below) that is incorporated within the ink, and in those cases where the dispersant is synthesized by solution polymerization in the manner described above, is preferably the same as the polymerization solvent.

The pigment dispersion comprising the pigment, the dispersant and the non-aqueous solvent is preferably obtained by mixing the three components together, and then dispersing the pigment using an appropriate dispersion device such as a ball mill or beads mill.

Amine compounds that can be used favorably within the present invention are readily soluble in most general-purpose non-aqueous inkjet solvents. In those cases where the amine compound is only slightly soluble or substantially insoluble in the solvent, shear must be applied during the reaction between the amine compound and the dispersant, but in the case of an amine compound with favorable solubility, application of this type of shear during reaction with the dispersant is unnecessary, which improves the handling properties.

The reaction between the amine compound and the dispersant is preferably conducted under stirring. Moreover, because heating generally improves the reaction efficiency, the reaction is preferably also conducted under heat. For example, the reaction is preferably conducted under heating at 60° C. or higher, although if the temperature is too high, then pigment aggregation caused by the heating becomes increasingly likely, and consequently the temperature is preferably no higher than approximately 100° C.

Moreover, if the two components undergo reaction at too low a temperature, then the mixing of the components must be conducted under cooling in order to prevent the reaction from occurring during mixing, which is actually inefficient. Accordingly, the two components are preferably those which react under a state of applied heat. In other words, the reactive functional groups of the dispersant are preferably functional groups that exhibit reactivity with amino groups under heat, and the reaction between the dispersant and the amine compound is preferably a thermal reaction (a reaction that occurs under heat).

The average particle size of the obtained pigment complex colorant is preferably not greater than approximately 500 nm, is even more preferably not greater than 200 nm, and is most preferably 150 nm or less. On the other hand, in order to suppress strike-through within the printed item, the average particle size is preferably at least approximately 50 nm. Here, the average particle size of the pigment complex refers to the value measured using a dynamic light scattering particle size distribution measurement apparatus LB-500 manufactured by Horiba, Ltd.

The non-aqueous solvent refers to a non-polar organic solvent or polar organic solvent for which the 50% distillation point is at least 150° C. The "50% distillation point" is measured in accordance with JIS K0066 "Test Methods for Distillation of Chemical Products" and refers to the temperature at which 50% by weight of the solvent is evaporated.

For example, examples of suitable non-polar organic solvents include aliphatic hydrocarbon solvents, alicyclic hydrocarbon solvents, and aromatic hydrocarbon solvents. Specific examples of suitable aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of suitable aromatic hydrocarbon solvents include Nisseki Cleansol G (alkylbenzene) manufactured by Nippon Oil Corporation, and Solvesso 200 manufactured by Exxon Mobil Corporation.

Examples of suitable polar organic solvents include ester-based solvents, alcohol-based solvents, higher fatty acid-based solvents, ether-based solvents, and mixtures thereof. Specific examples include ester-based solvents such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol and oleyl alcohol; higher fatty acid-based solvents such as isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether, and propylene glycol dibutyl ether.

These non-aqueous solvents may be used either alone, or in mixtures of two or more different solvents.

The blend quantity of the colorant (solid fraction) within the ink is preferably within a range from 0.1 to 25% by weight, even more preferably from 1 to 20% by weight, and is most preferably from 5 to 15% by weight.

Besides the colorant and non-aqueous solvent described above, the ink may also include, as required, any of the various additives typically used within the field, provided the inclusion of these additives does not impair the object of the present invention.

Specific examples of these additives include anionic surfactants, cationic surfactants, amphoteric surfactants, non-ionic surfactants, or polymer-based, silicone-based or fluorine-based surfactants, which are added as pigment dispersants, antifoaming agents, or surface tension reducing agents or the like.

An electrolyte may also be added to the ink to regulate the viscosity of the ink. Examples of suitable electrolytes include sodium sulfate, potassium hydrogen phosphate, sodium citrate, potassium tartrate and sodium borate, and two or more of these electrolytes may also be used in combination. Compounds such as sulfuric acid, nitric acid, acetic acid, sodium hydroxide, potassium hydroxide, ammonium hydroxide and triethanolamine may also be used as ink thickening assistants.

By adding an antioxidant, oxidation of the ink components can be prevented, enabling the storage stability of the ink to be improved. Examples of suitable antioxidants include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, enabling the storage stability of the ink to be improved. Examples of suitable preservatives include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

Moreover, by adding a polyoxyethylene alkylamine (an ethylene oxide adduct of an aliphatic amine: $C_nH_{2n+1}N[(EO)_xH][(EO)_yH]$) to the ink, the discharge stability can be further improved, and a higher level of print density can be achieved when printing to plain paper. In the above general formula, EO represents an oxyethylene group, and x and y each represent, independently, an integer of 0 or greater, provided that both are not zero.

Examples of suitable alkylamines include laurylamine, stearylamine, and oleylamine. Of these, from the viewpoints of ensuring even more favorable levels of discharge stability and low-temperature storage stability, laurylamine is preferred.

In terms of achieving superior discharge stability, high print density on plain paper, and superior storage stability under low-temperature conditions, the number of mols of added ethylene oxide (the combined total of x and y in the above general formula) is preferably within a range from 2 to 8, and is even more preferably from 3 to 7.

In those cases where a polyoxyethylene alkylamine is added, from the viewpoints of achieving superior discharge stability and high print density on plain paper, the blend quantity of the polyoxyethylene alkylamine within the ink is preferably within a range from 1.0 to 5.0% by weight.

The ideal range for the ink viscosity varies depending on factors such as the diameter of the discharge head nozzles and the discharge environment, but in general at 23° C. is preferably within a range from 5 to 30 mPa·s, and even more preferably from 5 to 15 mPa·s, and a viscosity of approximately 10 mPa·s is ideal for use with inkjet recording devices. Here, the viscosity is measured at 23° C. by raising the shear stress from 0 Pa at a rate of 0.1 Pa/s, and refers to the measured value at 10 Pa.

Although merely speculation, the reasons that the present invention yields the effects described above are thought to include the factors described below. Namely, pigments have conventionally adsorbed to adsorption sites on the dispersant, leading to their dispersion within the solvent, but desorption from these adsorption sites also occurs reasonably readily. In contrast, in the case of the colorant used in the present invention, it is thought that the amine compound that is chemically bonded to the dispersant exists in a configuration that encircles the pigment adsorbed to the dispersant, making desorption of the pigment from the dispersant less likely, and as a result, the dispersibility of the pigment is enhanced. At the same time, it is thought that because the dispersion efficiency of the dispersant is enhanced, the quantity of the dispersant can be kept at an appropriate level, meaning deterioration in the scratch resistance caused by excess dispersant can be avoided.

Moreover, the amine compound comprises two or more amino groups within each molecule, and is itself a highly polar compound, and it is thought that when the amine compound encircles the pigment, the solvent release properties of the pigment from the non-aqueous solvent are enhanced, meaning a higher print density can be obtained, and enabling strike-through of the ink through to the underside of the print target to be prevented.

In addition, although the diamine and/or triamine is soluble in the non-aqueous solvent and exhibits favorable handling properties, forming a complex of the pigment, the dispersant and the amine compound renders the amine insoluble in the solvent. As a result, it is thought that when the ink is transferred to the recording medium, solvent release occurs rapidly, enabling the prevention of ink strike-through.

A printed item according to the present invention is an item printed using the ink of the present invention described above. By using an ink according to the present invention, a printed item is obtained that exhibits superior print density with good suppression of ink strike-through, and has excellent scratch resistance.

There are no particular restrictions on the printing method used, although conducting the printing using an inkjet recording apparatus is preferred. The inkjet printer may employ any of various printing systems, including piezo systems, electrostatic systems and thermal systems. In those cases where an inkjet recording apparatus is used, the ink according to the present invention is discharged from the inkjet head based on a digital signal, and the discharged ink droplets are adhered to a recording medium.

EXAMPLES

As follows is a more detailed description of the present invention based on a series of examples, although the present invention is in no way limited by these examples. In the following examples, the units "% by weight" are recorded simply as "%".

<Synthesis of Dispersant>

In a 500 ml four-necked flask were mixed 32.1 g of behenyl methacrylate (manufactured by NOF Corporation), 57.9 g of lauryl methacrylate (manufactured by NOF Corporation), 5.0 g of dimethylaminoethyl methacrylate (manufactured by Wako Pure Chemical Industries, Ltd.) and 5.0 g of glycidyl methacrylate (manufactured by NOF Corporation), subsequently 1.5 g of V-65 (manufactured by Wako Pure Chemical Industries, Ltd.) as an azo-based polymerization initiator, 0.9 g of stearyl mercaptan (manufactured by Wako Pure Chemical Industries, Ltd.) as a chain transfer agent and 230.9 g of AF7 (AF solvent No. 7, a naphthene-based solvent, manufactured by Nippon Oil Corporation) were added, and the resulting mixture was then reacted under reflux for 5 hours under temperature conditions of 61° C.±3° C., thereby yielding a dispersant solution A (solid fraction: 30%). Following reaction, a small quantity (0.002 g) of methoquinone (p-methoxyphenol) was added as a polymerization inhibitor.

Example 1

In a 250 ml polypropylene container were mixed 54.0 g of the above dispersant solution A, 30.0 g of a black pigment MA11 (a carbon black, manufactured by Mitsubishi Chemical Corporation, primary particle size: 29 nm) and 66.0 g of IOP (isooctyl palmitate, manufactured by Nikko Chemicals Co., Ltd.) as a diluent solvent, 450 g of zirconia beads (diameter: 0.5 mm) were then added to the mixture, and dispersion was conducted for 60 minutes using a rocking mill (manufactured by Seiwa Technical Lab Co., Ltd.), thereby yielding a pigment dispersion.

The zirconia beads were removed from the above pigment dispersion by filtration, and 150 g of the filtered pigment dispersion and 0.972 g of Duomeen T (N-tallow alkyl-1,3-diaminopropane, manufactured by Lion Akzo Co., Ltd.) as the amine compound were then mixed in a 500 ml beaker and stirred for 3 hours at 80° C. Subsequently, 0.342 g of acetic acid was added, and stirring was continued for a further 3 hours at 80° C. The amine compound used had a total amine value within a range from 323 to 356, and an alkyl group composition comprising 30% of C16 groups and 64% of C18 groups.

To the thus obtained colorant solution were added 88.3 g of AF7 (as described above) and 60.3 g of IOP (as described above), and the beaker contents were then passed through 3.0 μm and 0.8 μm membrane filters to remove any contaminants or coarse particles, thereby yielding an ink of the example 1.

Examples 2 to 9, Comparative Examples 1 to 2

Inks were produced in the same manner as the example 1 described above, using the formulations shown in Table 1. In those cases where a carboxylic acid was not used, the ink was produced by reacting the pigment dispersion and the amine compound, and then adding the solvent to the resulting colorant dispersion. Table 1 shows the product names and manufacturers and the like for each of the components used. Those reagents for which a manufacturer is not listed were all manufactured by Wako Pure Chemical Industries, Ltd. The triamine Y12D is an alkyltriamine with an amine value within a range from 335 to 365, and in which the alkyl group composition comprises 98% of C12 groups. Furthermore, PEG 2(3-AP) T is a diamine with a molecular weight of approximately 1,500.

TABLE 1

| | Blended components | | Example 1 | Example 2 | Example 3 | Example 4 | Example 5 | Example 6 | Example 7 |
|---|---|---|---|---|---|---|---|---|---|
| | Dispersant solution A | | 54.0 | 54.0 | 54.0 | 54.0 | 54.0 | 54.0 | 54.0 |
| Pigment | MA11 | Carbon black (Mitsubishi Chemical) | 30.0 | 30.0 | 30.0 | 30.0 | 30.0 | 30.0 | 30.0 |
| Diluent solvent | IOP | Isooctyl palmitate (NIKKOL) | 66.0 | 66.0 | 66.0 | 66.0 | 66.0 | 66.0 | 66.0 |
| Diamine | Duomeen T | N-tallow alkyl-1,3-diaminopropane (Lion Akzo) | 0.972 | | | 0.972 | | | |
| | HEAPA | 2-hydroxyethylaminopropylamine (Koei Chemical) | | | | | 0.449 | | |
| | PEG 2(3-AP) T | Polyethylene glycol bis(3-aminopropyl) terminated (Aldrich) | | | | | | 5.698 | |
| | 1,3-PDA | 1,3-propanediamine | | | | | | | 0.281 |
| | 1,2-EDA | Ethylenediamine | | | | | | | |
| Triamine | Triamine Y12D | Alkyltriamine (Lion Akzo) | | 1.706 | | 1.706 | | | |
| Tetramine | TATD | 1,5,9,13-tetraazatridecane | | | | | | | |
| Monocarboxylic acid | | Acetic acid | 0.342 | | | | | | 0.342 |
| | | Butyric acid | | 0.501 | | | | | |
| | | Valeric acid | | | | | | | |
| Dicarboxylic acid | | Oxalic acid | | | | | | | |
| Viscosity-regulating | AF7 | Naphthene-based solvent (Nippon Oil) | 88.3 | 87.5 | 88.7 | 88.0 | 89.2 | 84.0 | 89.0 |

TABLE 1-continued

| | | Blended components | | | | | | | |
|---|---|---|---|---|---|---|---|---|---|
| solvent | IOP | Isooctyl palmitate (NIKKOL) | 60.3 | 60.3 | 60.3 | 60.3 | 60.3 | 60.3 | 60.3 |
| Properties | | Number of parts of pigment | 10.0 | 10.0 | 10.0 | 10.0 | 10.0 | 10.0 | 10.0 |
| Properties | | Particle size (initial) | 95.5 | 92.9 | 95.8 | 99.0 | 97.2 | 97.1 | 99.4 |
| Evaluated property | | Printed item print density: OD (upper surface) | A | A | A | A | A | A | A |
| | | Printed item strike-through | A | A | B | B | B | B | A |
| | | Storage stability | A | A | A | A | B | B | B |
| | | Low-temperature storage stability | A | A | B | B | B | B | A |
| | | Printed item scratch resistance | A | A | B | B | B | B | A |

| | | Blended components | Example 8 | Example 9 | Comparative example 1 | Comparative example 2 | Comparative example 3 |
|---|---|---|---|---|---|---|---|
| | | Dispersant solution A | 54.0 | 54.0 | 54.0 | 54.0 | 54.0 |
| Pigment | MA11 | Carbon black (Mitsubishi Chemical) | 30.0 | 30.0 | 30.0 | 30.0 | 30.0 |
| Diluent solvent | IOP | Isooctyl palmitate (NIKKOL) | 66.0 | 66.0 | 66.0 | 66.0 | 66.0 |
| Diamine | Duomeen T | N-tallow alkyl-1,3-diaminopropane (Lion Akzo) | | 0.972 | | | |
| | HEAPA | 2-hydroxyethylaminopropylamine (Koei Chemical) | | | | | |
| | PEG 2(3-AP) T | Polyethylene glycol bis(3-aminopropyl) terminated (Aldrich) | | | | | |
| | 1,3-PDA | 1,3-propanediamine | | | | | |
| | 1,2-EDA | Ethylenediamine | | | 0.228 | | |
| Triamine | Triamine Y12D | Alkyltriamine (Lion Akzo) | 1.706 | | | | |
| Tetramine | TATD | 1,5,9,13-tetraazatridecane | | | | 0.857 | 0.857 |
| Monocarboxylic acid | | Acetic acid | | | | | 0.342 |
| | | Butyric acid | | | | | |
| | | Valeric acid | 0.396 | | | | |
| Dicarboxylic acid | | Oxalic acid | | 0.302 | | | |
| Viscosity-regulating solvent | AF7 | Naphthene-based solvent (Nippon Oil) | 87.6 | 88.4 | 89.4 | 88.8 | 88.5 |
| Viscosity-regulating solvent | IOP | Isooctyl palmitate (NIKKOL) | 60.3 | 60.3 | 60.3 | 60.3 | 60.3 |
| | | Number of parts of pigment | 10.0 | 10.0 | 10.0 | 10.0 | 10.0 |
| Properties | | Particle size (initial) | 104.4 | 104.4 | 99.4 | 99.4 | 99.4 |
| Evaluated property | | Printed item print density: OD (upper surface) | B | A | A | C | C |
| | | Printed item strike-through | B | A | B | B | A |
| | | Storage stability | A | B | C | A | A |
| | | Low-temperature storage stability | A | A | C | A | A |
| | | Printed item scratch resistance | A | A | C | B | B |

The initial particle size of the ink was measured immediately following ink preparation, and refers to the value measured for the particle size of the pigment complex using a dynamic light-scattering particle size distribution measurement apparatus LB-500 manufactured by Horiba, Ltd.

The properties of each ink were evaluated using the methods described below.

<Storage Stability>

Each ink was placed in a sealed container and stored for 4 weeks in an atmosphere at 70° C., the variation in the viscosity of the ink and the variation in the particle size were measured, and the results of those measurements were then evaluated in the manner described below.

Viscosity Variation:

[(Viscosity after 4 weeks×100)/(Initial viscosity value)]−100(%)

Particle Size Variation:

[(Particle size after 4 weeks×100)/(Initial particle size value)]−100(%)

Inks for which the viscosity variation and the particle size variation were both less than 5% were evaluated as A, inks for which at least one of the viscosity variation and the particle size variation was at least 5% but less than 10% were evaluated as B, and inks for which at least one of the viscosity variation and the particle size variation was at least 10% were evaluated as C.

<Low-temperature Storage Stability>

Each ink was placed in a sealed container and stored for three days in an atmosphere at −5° C., the variation in the viscosity of the ink and the variation in the particle size were measured, and the results of those measurements were then evaluated in the manner described below.

Viscosity Variation:

[(Viscosity after 3 days×100)/(Initial viscosity value)]−100(%)

Particle Size Variation:

[(Particle size after 3 days×100)/(Initial particle size value)]−100(%)

Inks for which the viscosity variation and the particle size variation were both less than 5% were evaluated as A, inks for which at least one of the viscosity variation and the particle size variation was at least 5% but less than 10% were evaluated as B, and inks for which at least one of the viscosity variation and the particle size variation was at least 10% were evaluated as C.

<Printed Item Print Density>

Each ink was loaded into an inkjet recording apparatus HC5000 (manufactured by Riso Kagaku Corporation), and subsequently printed onto plain paper (Riso light paper (manufactured by Riso Kagaku Corporation)), yielding a printed item. The HC5000 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

The OD value of the printed surface (the upper surface) of the thus obtained printed item was measured using an optical densitometer RD920 (manufactured by MacBeth Corporation), and values of 1.1 or greater were evaluated as A, values of at least 1.0 but less than 1.1 were evaluated as B, and values of less than 1.0 were evaluated as C.

<Printed Item Strike-Through>

The non-printed surface (the underside) of the printed items obtained above were inspected visually, and items with no noticeable strike-through were evaluated as A, items with slight strike-through were evaluated as B, and items with noticeable strike-through were evaluated as C.

<Ink Scratch Resistance>

The printed items obtained above were left to stand for one day, and the OD value of a solid-printed portion was then measured using an optical densitometer RD920 (manufactured by MacBeth Corporation). Subsequently, a plastic eraser was rubbed 5 times back and forth across the solid-printed portion using a loading of approximately 9 N, and the OD value was then re-measured. The difference in the print density before and after the rubbing operation with the eraser was calculated, and printed items for which the density difference was less than 0.02 were evaluated as A, items for which the density difference was at least 0.02 but less than 0.1 were evaluated as B, and items for which the density difference was 0.1 or greater were evaluated as C.

The above results are shown above in Table 1.

Using the monomers shown in Table 2, dispersant solutions were prepared in the same manner as the dispersant solution A described above. Using the thus obtained dispersant solutions B to F, inks were prepared in the same manner as the examples described above. These inks were evaluated, and similar results to those obtained for the dispersant solution A were obtained.

the amine compound is either one of or both of a diamine and triamine, comprising two or more, either one of or both of primary and secondary amino groups within each molecule, and the dispersant comprises two or more reactive functional groups within each molecule that exhibit reactivity with the amino groups of the amine compound, the dispersant is a polymer dispersant that further comprises a lipophilic group that functions as a solvent affinity site, and a pigment-adsorbing functional group that functions as a pigment adsorption site, and the lipophilic group of the polymer dispersant is a hydrocarbon group of 7 or more carbon atoms, and the pigment-adsorbing functional group is a tertiary amino group, and wherein the diamine is represented by a general formula (1):

$$NHR_1-(X)_n-NHR_2$$

wherein, $R_1$ and $R_2$ each represent, independently, a hydrogen atom, a straight-chain or branched-chain alkyl group of 12 or more carbon atoms that is optionally substituted, or an arbitrary monovalent group, and either one of, or both of $R_1$ and $R_2$ represent the alkyl group of 12 or more carbon atoms; X represents at least one bivalent group of 3 or more carbon atoms, which is optionally substituted and which is selected from the group consisting of straight-chain alkylene chains, branched-chain alkylene chains, ethylene oxide chains, propylene oxide chains, and butylene oxide chains; and n represents an integer of 1 or greater, and the triamine is represented by a general formula (2):

$$NHR_1-(X)_n-NR_3-(Y)_m-NHR_2$$

TABLE 2

| | Abbreviated name | Chemical name | Dispersant solution | | | | |
|---|---|---|---|---|---|---|---|
| | | | B | C | D | E | F |
| Blended monomer/g | VMA | behenyl methacrylate (NOF Corporation) | 26.3 | | 26.3 | | 26.3 |
| | LMA | lauryl methacrylate (NOF Corporation) | | 73.7 | 47.4 | | |
| | iSMA | isostearyl methacrylate (Shin-Nakamura Chemical Co., Ltd.) | | | | 69.1 | |
| | 2-EHMA | 2-ethylhexyl methacrylate (Wako Pure Chemical Industries, Ltd.) | 47.4 | | | | 46.9 |
| | DM | dimethylaminoethyl methacrylate (Wako Pure Chemical Industries, Ltd.) | 9.2 | 9.2 | | 9.2 | 9.2 |
| | DE | diethylaminoethyl methacrylate (Wako Pure Chemical Industries, Ltd.) | | | 9.2 | | |
| | GM | glycidyl methacrylate (NOF Corporation) | 4.6 | 4.6 | 4.6 | 9.2 | |
| | MOI | 2-isocyanatoethyl methacrylate (Showa Denko K.K.) | | | | | 5.0 |

It should be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A non-aqueous pigment ink comprising a colorant and a non-aqueous solvent, wherein the colorant is a pigment complex of a pigment having acidic sites, a dispersant and an amine compound, wherein, $R_1$, $R_2$ and $R_3$ each represent, independently, a hydrogen atom, a straight-chain or branched-chain alkyl group of 12 or more carbon atoms that is optionally substituted, or an arbitrary monovalent group, and one or more of $R_1$, $R_2$ and $R_3$ represent the alkyl group of 12 or more carbon atoms; X and Y each represent, independently, at least one bivalent group of 3 or more carbon atoms, which is optionally substituted and which is selected from the group consisting of straight-chain alkylene chains, branched-chain alkylene chains, ethylene oxide chains, propylene oxide chains, and butylene oxide chains; and n and m each represent independently, an integer of 1 or greater.

2. The non-aqueous pigment ink according to claim 1, wherein the polymer dispersant is a copolymer comprising a monomer (M1) containing a lipophilic group, a monomer (M2) containing a pigment-adsorbing functional group, and a monomer (M3) containing a reactive functional group that exhibits reactivity with either one of or both of the primary and secondary amino groups.

3. The non-aqueous pigment ink according to claim 1, wherein the reactive functional groups of the dispersant are glycidyl groups.

4. The non-aqueous ink according to claim 1, wherein the lipophilic group of the polymer dispersant is selected from the group consisting of straight-chain alkyl groups of 12 or more carbon atoms, branched-chain alkyl groups of 8 or more carbon atoms, and aromatic ring-containing groups of 7 or more carbon atoms.

5. The non-aqueous pigment ink according to claim 1, wherein the pigment is a carbon black.

6. A non-aqueous pigment ink, comprising a colorant and a non-aqueous solvent, wherein the colorant is a pigment complex of:
a polymer dispersant comprising a lipophilic group that is a hydrocarbon group of 7 or more carbon atoms and functions as a solvent affinity site, a pigment-adsorbing functional group that is a tertiary amino group as a pigment-adsorption site, and two or more reactive functional groups that react with amino groups;
a pigment having acidic sites bound at the pigment-adsorption site of the dispersant; and
an amine compound that is at least one selected from diamine and triamine, the diamine and triamine comprising at least one selected from a primary amine group and a secondary amine group within each molecule, the reactive functional groups and the amine compound have reacted to at least partially cover the pigment, and the diamine is represented by a general formula (1):

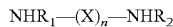

wherein, $R_1$ and $R_2$ each represent, independently, a hydrogen atom, a straight-chain or branched-chain alkyl group of 12 or more carbon atoms that is optionally substituted, or an arbitrary monovalent group, and either one of, or both of $R_1$ and $R_2$ represent the alkyl group of 12 or more carbon atoms; X represents at least one bivalent group of 3 or more carbon atoms, which is optionally substituted and which is selected from the group consisting of straight-chain alkylene chains, branched-chain alkylene chains, ethylene oxide chains, propylene oxide chains, and butylene oxide chains; and n represents an integer of 1 or greater, and the triamine is represented by a general formula (2):

wherein, $R_1$, $R_2$ and $R_3$ each represent, independently, a hydrogen atom, a straight-chain or branched-chain alkyl group of 12 or more carbon atoms that is optionally substituted, or an arbitrary monovalent group, and one or more of $R_1$, $R_2$ and $R_3$ represent the alkyl group of 12 or more carbon atoms; X and Y each represent, independently, at least one bivalent group of 3 or more carbon atoms, which is optionally substituted and which is selected from the group consisting of straight-chain alkylene chains, branched-chain alkylene chains, ethylene oxide chains, propylene oxide chains, and butylene oxide chains; and n and m each represent independently, an integer of 1 or greater.

7. The non-aqueous pigment ink according to claim 6, wherein the polymer dispersant is a copolymer comprising a monomer (M1) containing a lipophilic group, a monomer (M2) containing a pigment-adsorbing functional group, and a monomer (M3) containing reactive functional groups that exhibit reactivity with either one of or both of the primary and secondary amino groups.

8. The non-aqueous pigment ink according to claim 6, wherein the reactive functional groups of the dispersant are glycidyl groups.

9. The non-aqueous ink according to claim 6, wherein the lipophilic group of the polymer dispersant is selected from the group consisting of straight-chain alkyl groups of 12 or more carbon atoms, branched-chain alkyl groups of 8 or more carbon atoms, and aromatic ring-containing groups of 7 or more carbon atoms.

10. The non-aqueous ink according to claim 6, wherein the colorant further comprises a carboxylic acid to form an acid amide with free amino groups from the amine compound that have not reacted with the reactive functional groups of the polymer dispersant.

11. The non-aqueous ink according to claim 6, wherein the colorant has a particle size of at least 50 nm and not greater than 500 nm.

12. The non-aqueous ink according to claim 11, wherein the colorant has a particle size not greater than 200 nm.

13. The non-aqueous ink according to claim 12, wherein the colorant has a particle size not greater than 150 nm.

14. The non-aqueous pigment ink according to claim 6, wherein the pigment is a carbon black.

15. A printed item printed using the non-aqueous pigment ink according to claim 1.

16. A printed item printed using the non-aqueous pigment ink according to claim 6.

* * * * *